July 18, 1967 E. J. AUGUSTYN ETAL 3,331,318
PROOF PRESS SYSTEM
Filed June 24, 1964
9 Sheets-Sheet 1
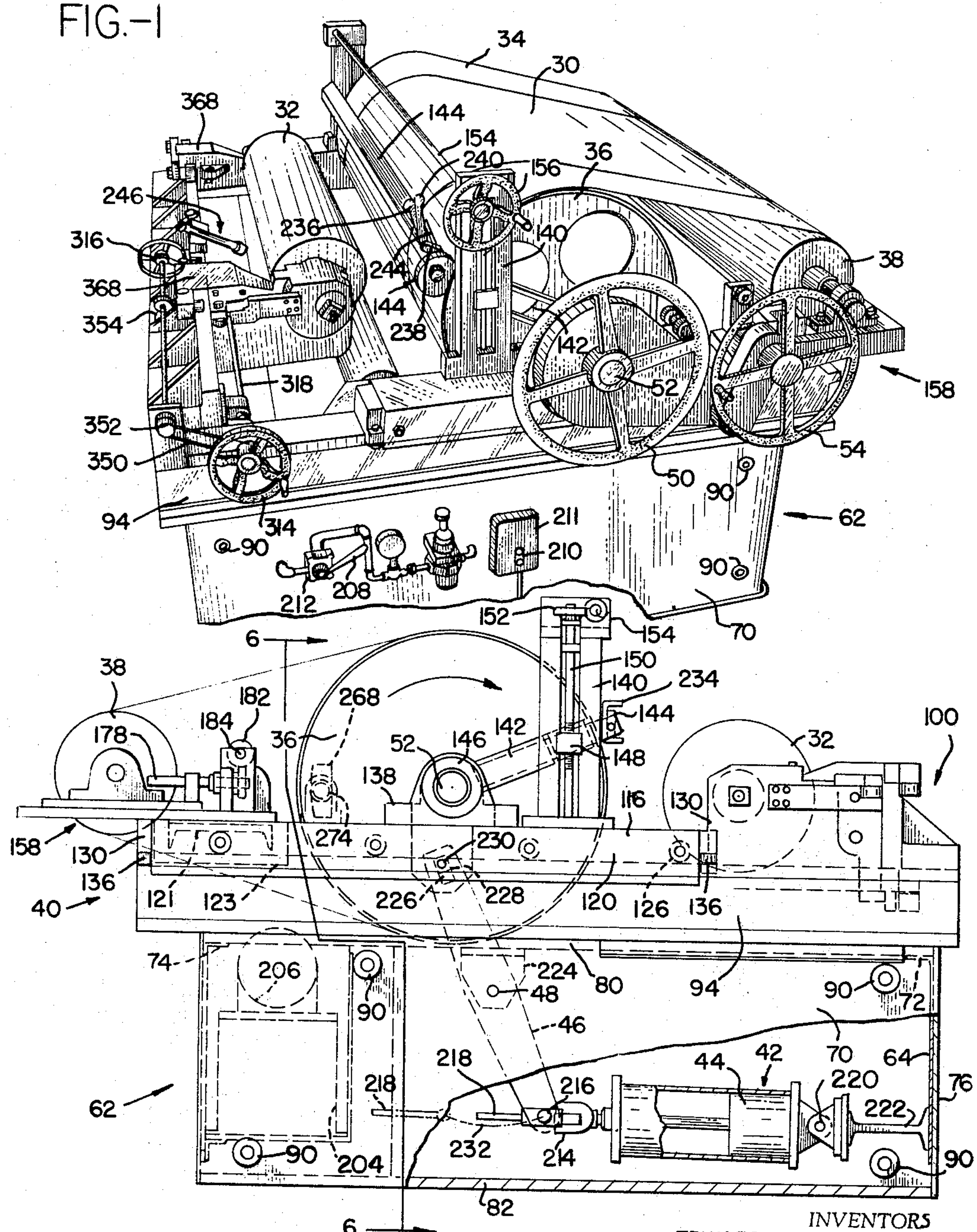
INVENTORS
EDWARD J. AUGUSTYN
JOHN J. SCHAEFER
BY Glenn Palmer Matthews
THEIR ATTORNEYS PROOF PRESS SYSTEM
Filed June 24, 1964
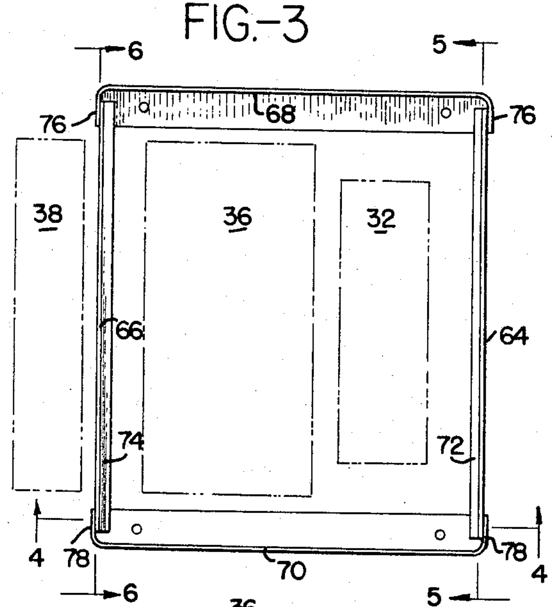
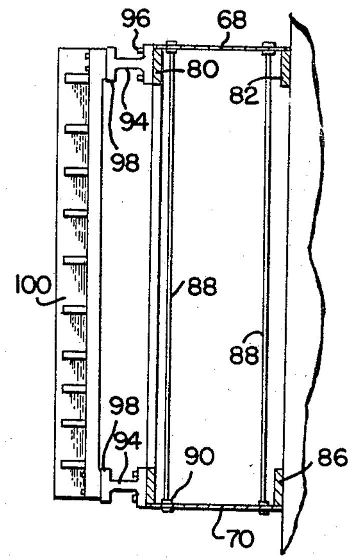
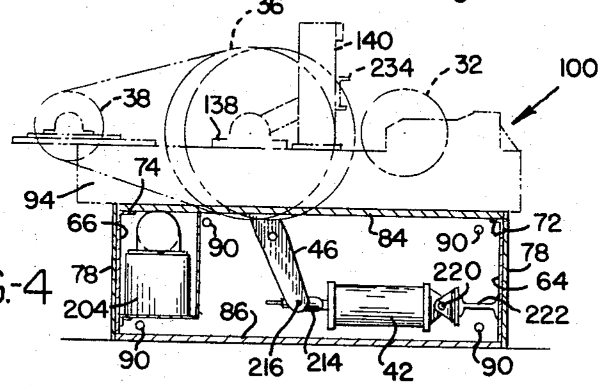
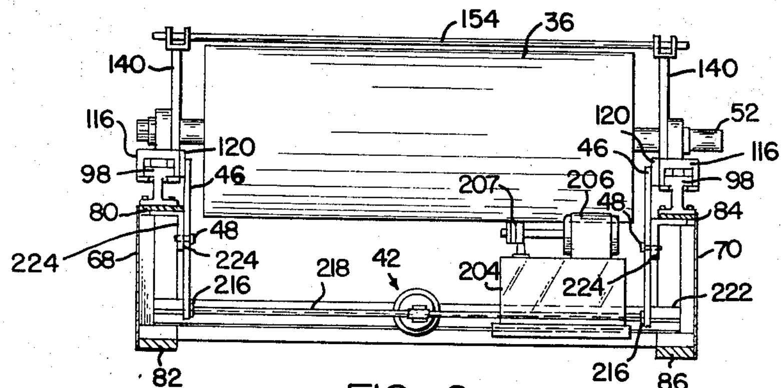
INVENTORS
EDWARD J. AUGUSTYN
JOHN J. SCHAEFER
BY
Glenn Palmer & Matthews
THEIR ATTORNEYS

PROOF PRESS SYSTEM

Filed June 24, 1964

*INVENTORS*
EDWARD J. AUGUSTYN
JOHN J. SCHAEFER
BY Glenn Palmer & Matthews
THEIR ATTORNEYS

PROOF PRESS SYSTEM

Filed June 24, 1964

INVENTORS
EDWARD J. AUGUSTYN
JOHN J. SCHAEFER
BY
Glenn Palmer Matthews
THEIR ATTORNEYS PROOF PRESS SYSTEM
Filed June 24, 1964
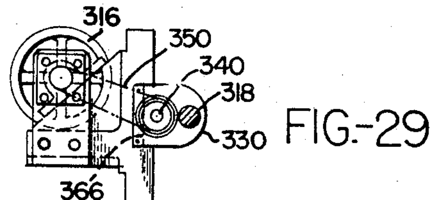
FIG.-29
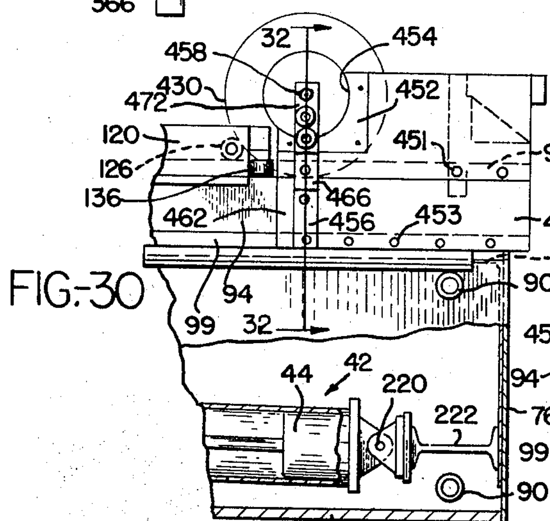
FIG.-30
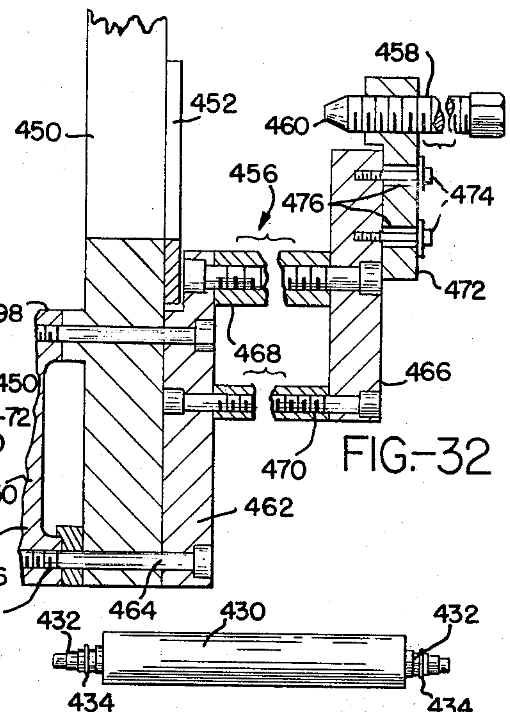
FIG.-32
432
430
432
434
434
FIG-31
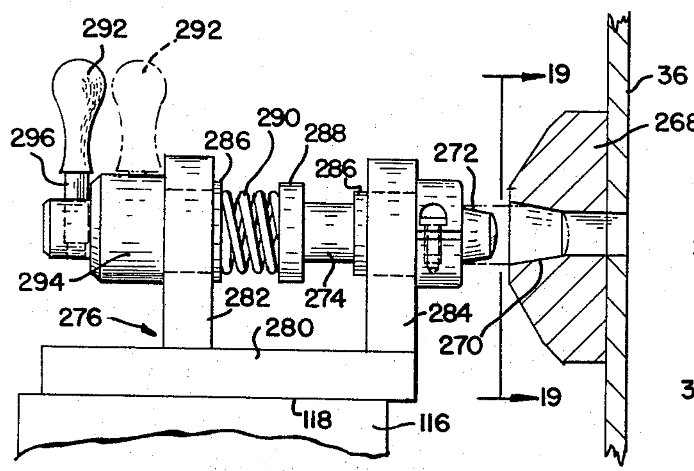
FIG.-18
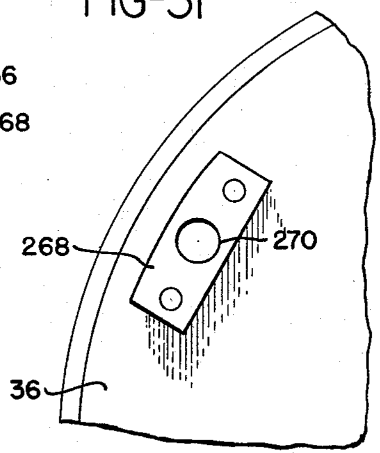
FIG.-19
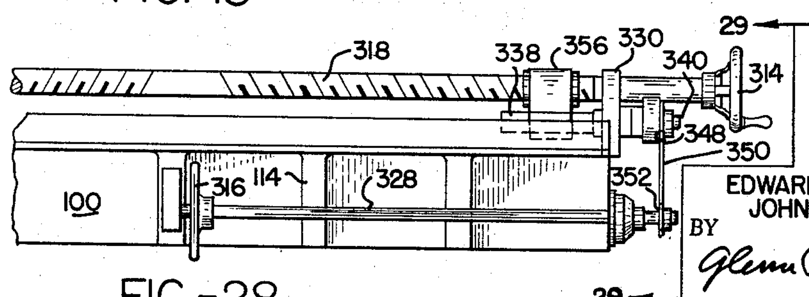
FIG.-28
INVENTORS
EDWARD J. AUGUSTYN
JOHN J. SCHAEFER
BY
Glenn Palmer Matthews
THEIR ATTORNEYS PROOF PRESS SYSTEM
Filed June 24, 1964
9 Sheets-Sheet 6
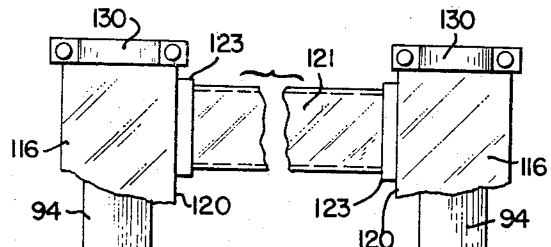
FIG-20
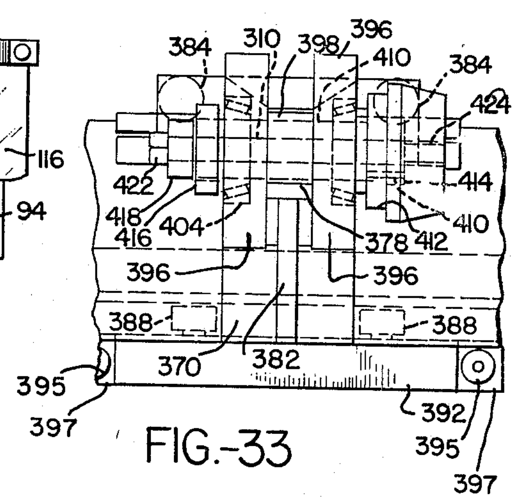
FIG.-33
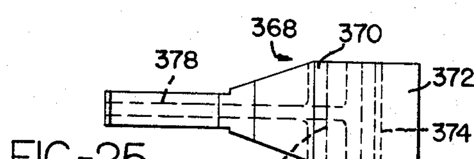
FIG.-25
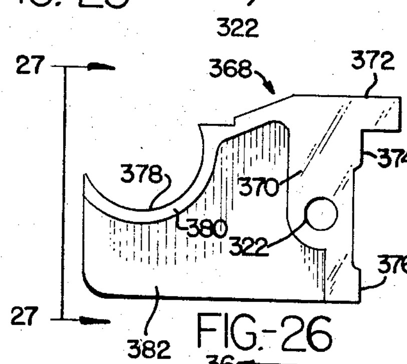
FIG.-26
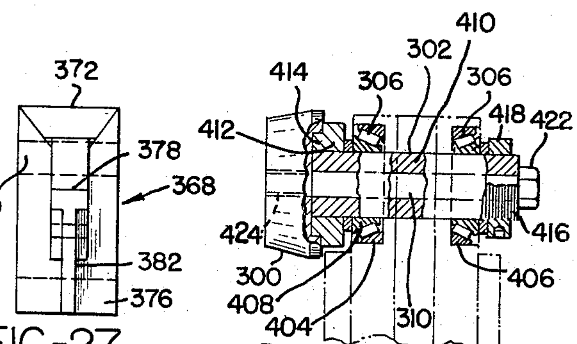
FIG.-27
FIG.-36
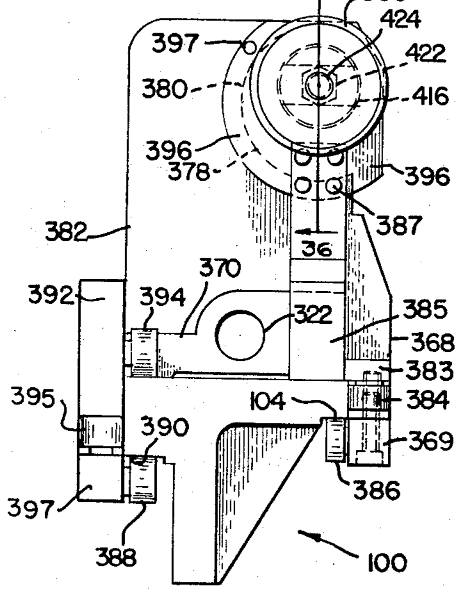
FIG.-35
35 33 308 306 310 308 306 420 418 422 33 324 300 416 410 302 396 304 392 383 385 368 394 394 384 384 35 369 386 386
FIG.-34
INVENTORS
EDWARD J. AUGUSTYN
JOHN J. SCHAEFER
BY Glenn Palmer Matthews
THEIR ATTORNEYS PROOF PRESS SYSTEM
Filed June 24, 1964 9 Sheets-Sheet 7
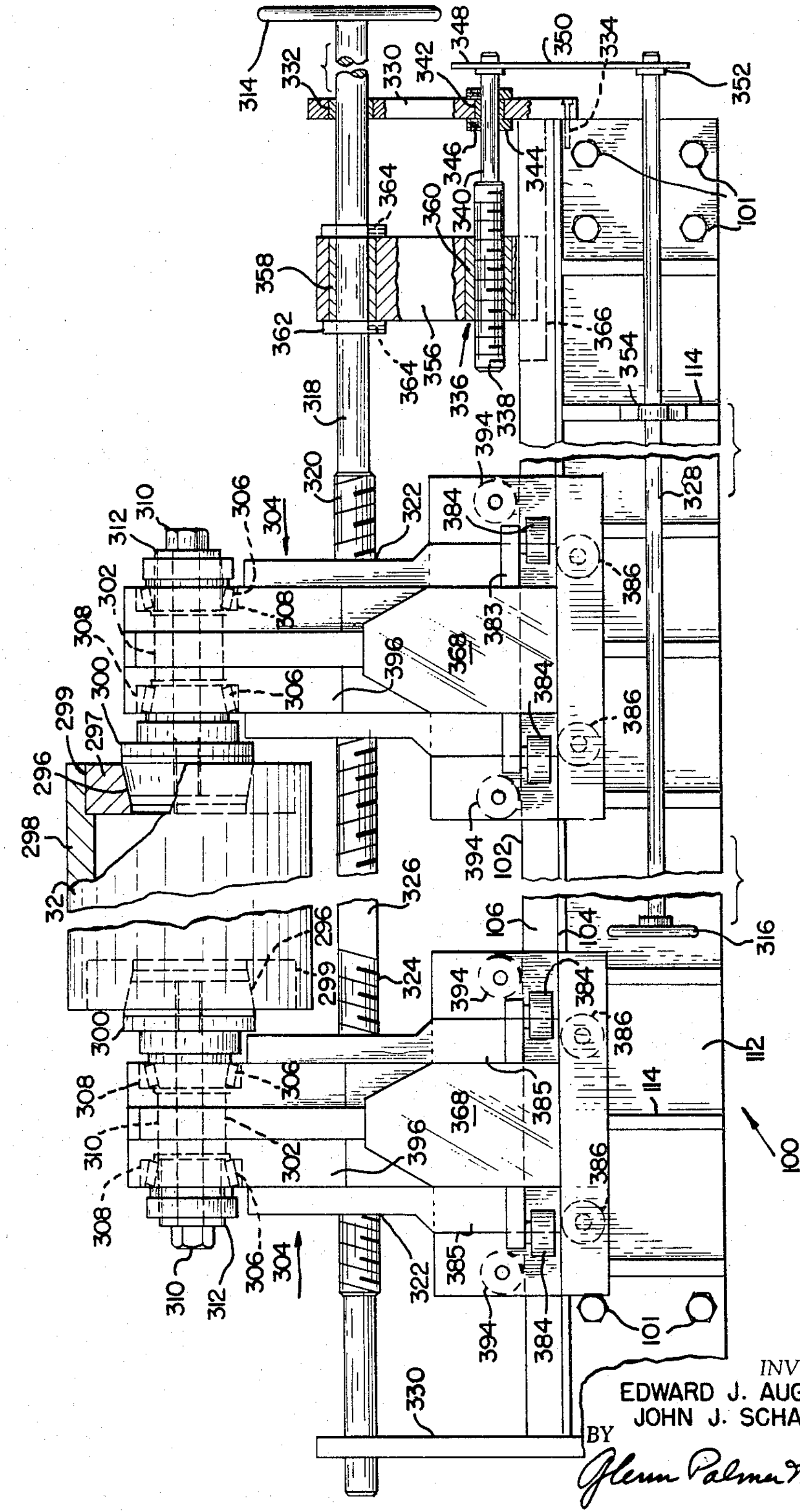
INVENTORS
EDWARD J. AUGUSTYN
JOHN J. SCHAEFER
BY Glenn Palmer Matthews
THEIR ATTORNEYS PROOF PRESS SYSTEM
Filed June 24, 1964 9 Sheets-Sheet 8
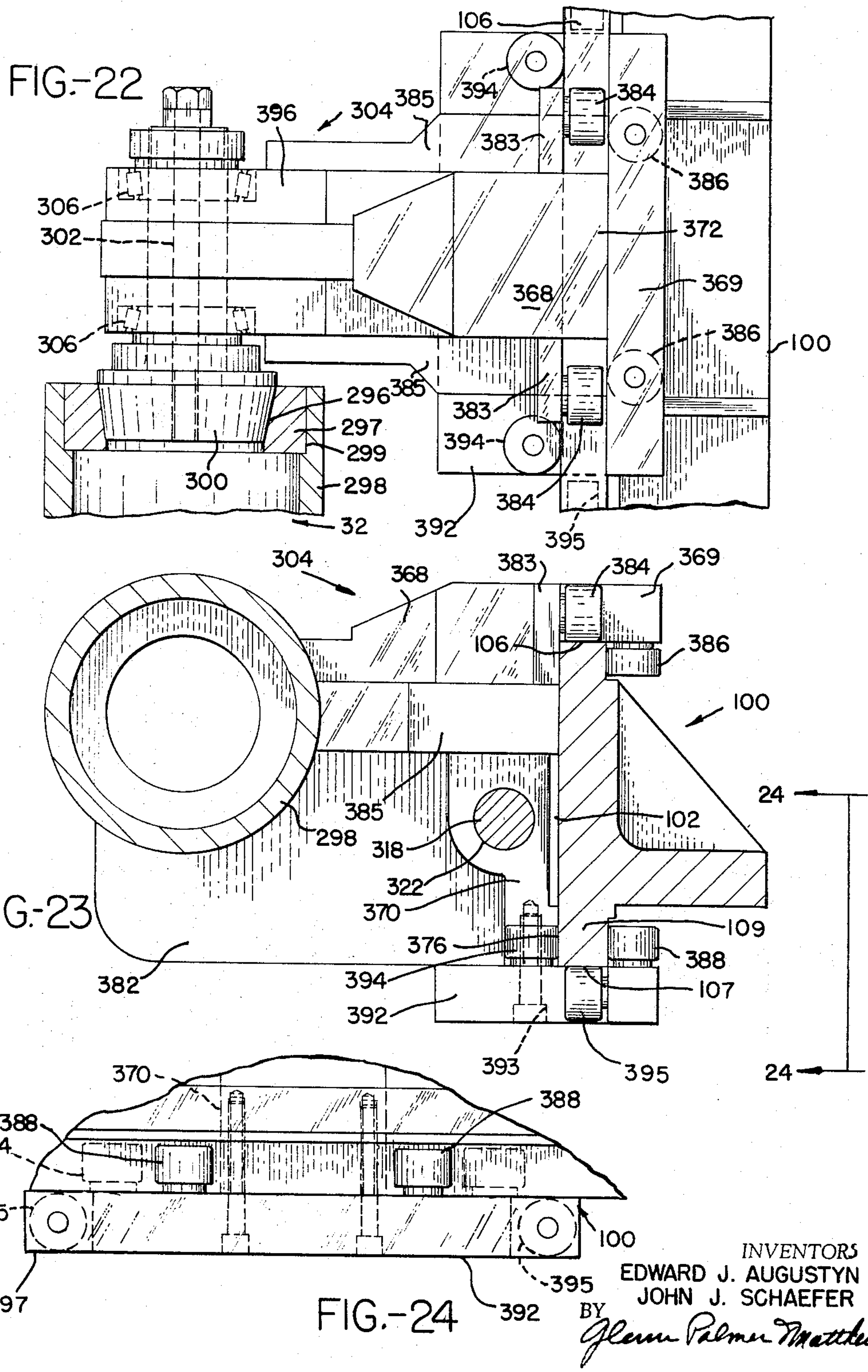
INVENTORS
EDWARD J. AUGUSTYN
JOHN J. SCHAEFER
BY Glenn Palmer Matthews
THEIR ATTORNEYS PROOF PRESS SYSTEM
Filed June 24, 1964
9 Sheets-Sheet 9
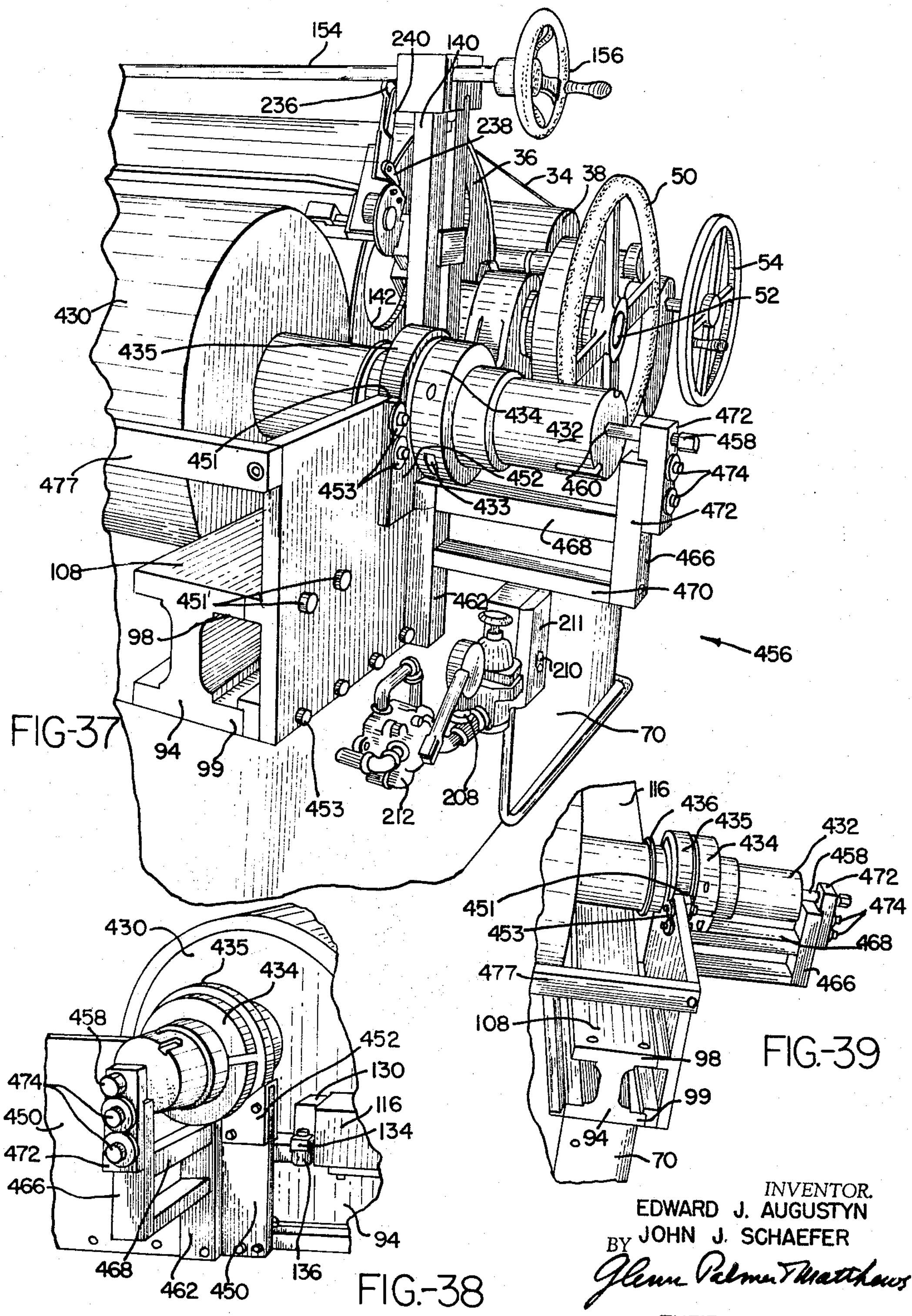
INVENTOR.
EDWARD J. AUGUSTYN
BY JOHN J. SCHAEFER
Glenn Palmer & Matthews
THEIR ATTORNEYS United States Patent Office 3,331,318 Patented July 18, 1967

3,331,318
PROOF PRESS SYSTEM

Edward J. Augustyn and John J. Schaefer, Louisville, Ky., assignors to Reynolds Metals Company, Richmond, Va., a corporation of Delaware Filed June 24, 1964, Ser. No. 377,604
14 Claims. (Cl. 101—216)

This invention relates to a belt type proof press and method and particularly to a proof press for use in connection with a series of rotogravure printing cylinders for repeated printing on the proof sheet by a plurality of different cylinders.

One feature of this invention includes a construction in which a proof sheet is mounted on a belt construction which may be unitarily moved relatively toward and away from the printing cylinder holding construction.

Another feature includes a movable carriage which supports the belt construction and the drums on which the belt is mounted.

Another feature of this invention includes a printing cylinder construction provided with end recesses, instead of outwardly directed shafts, for engagement with laterally movable cantilever supports for the ends of the cylinder.

Another feature includes the use of end supports for the cylinder which supports may be moved axially of the cylinder relatively toward and away from each other by one operation for removal or insertion of the cylinder and simultaneously together axially of the cylinder while holding the cylinder, for positioning the cylinder at a desired location in the press, such as at a "zero" position.

Another feature of this invention includes rigid and accurate constructions for the above features which permit serial printing on the same proof sheet with the great accuracy required in modern rotogravure practice.

Another feature includes the use of a long belt construction for the support of an unusually long proof sheet of a length not possible with previous single drum constructions.

Many other features of this invention are apparent from this description, the appended claimed subject matter, and/or the accompanying drawings, in which:

FIGURE 1 is a general view, in perspective, of an apparatus embodying this invention with the front of the apparatus embodying this invention with the front of the apparatus extending along the left side of FIGURE 1.

FIGURE 2 is a general longitudinal vertical view of the apparatus shown in FIGURE 1, and viewed from the opposite side of FIGURE 1.

FIGURE 3 is a horizontal view of the main base for supporting the apparatus, with certain other parts indicated in phantom or dotted line illustration.

FIGURE 4 is a vertical cross section along line 4—4 of FIGURE 3, with certain other parts indicated in phantom or dotted line illustration.

FIGURE 5 is a vertical cross section along the line 5—5 of FIGURE 3, with certain other parts added, as viewed from the front of the apparatus.

FIGURE 6 is a vertical cross section generally along lines 6—6 of FIGURES 2 and 3.

FIGURE 18 is a side view of the lock pin construction for locking the large belt drum at zero position.

FIGURE 19 is a partial side view of the large belt drum as viewed from line 19—19 of FIGURE 18.

FIGURE 20 is a top view of the rear ends of the longitudinal inverted channels of the movable carriage, and showing the transverse channel shown in FIGURE 2 which holds the longitudinal channels together.

FIGURE 21 is a diagrammatic top view of the front rail portion of the apparatus showing diagrammatically the adjustable cantilever supports for the inner cone type of printing cylinders, and the adjusting means for such cantilever supports.

FIGURE 22 is a top view of one of the cantilever supports shown in FIGURE 21.

FIGURE 23 is a transverse vertical cross section of FIGURE 22.

FIGURE 24 is a side elevation of a portion of FIGURE 23 taken from the line 24—24 of FIGURE 23.

FIGURE 25 is a top view of one of the components of the cantilever construction.

FIGURE 26 is a side view of FIGURE 25.

FIGURE 27 is a rear view of FIGURES 25 and 26 taken from line 27—27 of FIGURE 26.

FIGURE 28 is a reduced scale illustration of a portion of FIGURE 21.

FIGURE 29 is an end elevation of FIGURE 28 taken from the line 29—29 of FIGURE 28.

FIGURE 30 is an end view of one of the two supports for the end shafts of the long printing cylinder diagrammatically illustrated in FIGURE 31.

FIGURE 31 is a diagrammatic illustration of a long printing cylinder that may be substantially as long as the larger belt drum for printing proof sheets of extra width.

FIGURE 32 is an enlarged vertical view of the sidewise registering mechanism for the ends of the shafts of the cylinder of FIGURE 31, taken along the line 32—32 of FIGURE 30.

FIGURE 33 is a vertical end view of one of the cantilever supporting members from inside the proof press, and taken from the line 33—33 of FIGURE 34.

FIGURE 34 is a top view of FIGURE 33.

FIGURE 35 is a side view of FIGURE 34, taken along the line 35—35 of FIGURE 34.

FIGURE 36 is a cross-sectional view along line 36—36 of FIGURE 35, of the rotatable axial extension and cone shaped disc construction shown partly in elevation and partly in cross section.

FIGURE 37 is a perspective view of the long cylinder construction and support disclosed in FIGURES 30–32.

FIGURE 38 is a perspective view of the structure of FIGURE 37 from another angle.

FIGURE 39 is a front perspective view of the structure of FIGURES 37 and 38.

Figure 7:
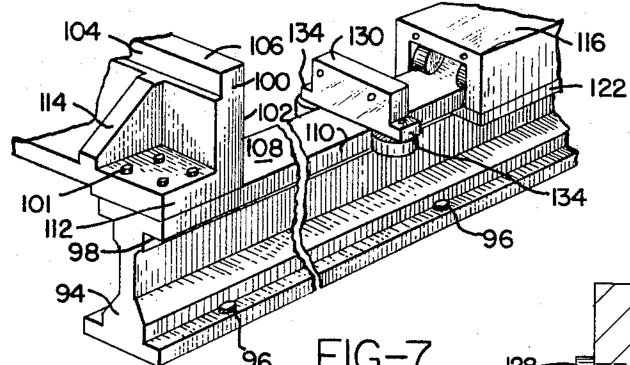
FIGURE 7 is a perspective view of an upper corner of the meeting of a side rail with end or front rail.

This invention relates to a proof press, which is shown generally in FIGURES 1 and 2, and which is adapted to make one or more printings on one or more proof sheets 30 from one or more printing cylinders 32, to determine whether the cylinder or cylinders 32 are satisfactory to be used in high speed presses for printing a large volume of printings. For this purpose the proof sheet is attached by masking tape or the like, to a proof sheet receiving proof belt 34 which is mounted on a pair of belt supporting drums 36 and 38. The drums 36 and 38 are mounted on a proof belt supporting carriage 40 on which said drums 36 and 38 are mounted in parallel relationship to the printing cylinder 32.

Means are provided to move the carriage 40, with the drums 36 and 38, with the proof sheet 30, and with the belt 34 as a unit toward the printing cylinder 32 to press the proof sheet 30 against the printing cylinder 32 by means of the proof belt and by means of one of the drums 36, to cause the cylinder 32 to print its engravings on the proof sheet 30.

After the proof sheet 30 and the belt 34 have been moved against the drum 32, means are provided to rotate the proof sheet 30, belt 34, and the drums 36 and 38 to cause the cylinder 32 to print any of its engravings on the proof sheet 30. Means are also provided to move the carriage, drums, proof sheet and belt away from the cylinder 32 after the proof has been printed on the sheet 30.

The means for causing the movement of the carriage 40 toward and away from the printing cylinder 32 may include a hydraulic system, such as hydraulic cylinder piston construction 42, which has a piston 44 that rocks a pair of levers 46, which are pivoted about the fulcrum 48, and which are connected at their other ends to the carriage 40.

Figure 13:
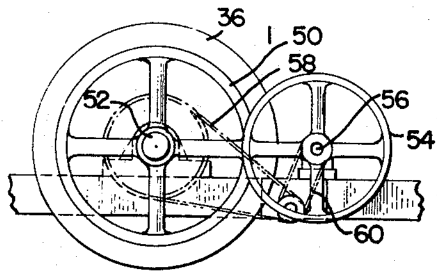
FIGURE 13 is a side view showing the connection of the direct drive hand wheel and of the reduced motion wheel to the shaft of the large belt drum.
Figure 14:
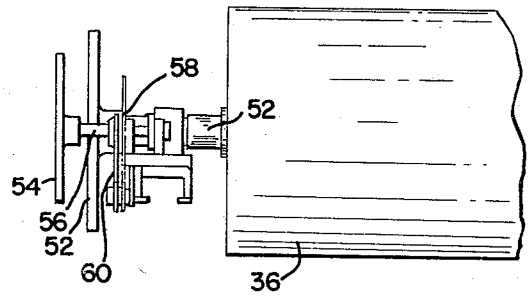
FIGURE 14 is a side elevation of FIGURE 13.
Figure 15:
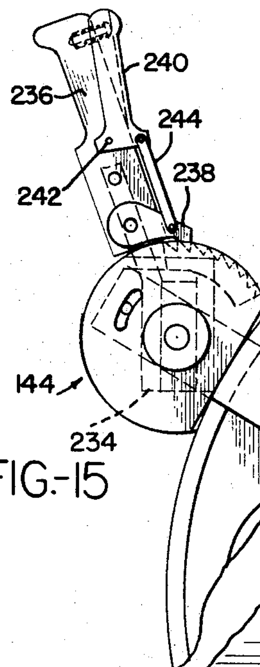
FIGURE 15 is a diagrammatic showing of a well known doctor blade holding and adjusting means to be used with this construction.

Rotation of the drums 36 and 38, and the belt 34 and proof sheet 30 may be accomplished by the direct drive hand wheel 50, which is directly connected to the shaft 52 of the drum 36. The hand wheel 50 may be used for fast but rough location of the belt 34 with respect to the cylinder 32. Thereafter, a slower and finer adjustment may be made by the reduced gear wheel 54, which rotates the shaft 56. The shaft 56 rotates the shaft 52 at slow motion driven by means of the chains 58 and 60, which are shown more in detail in FIGURES 13 and 14.

The belt 34 may be made of a long sheet of "blanket" which is a commercial rubber covered core material of any suitable kind which is not subject to variable stretching. The ends of the sheet are secured together by the usual belt joining technique for joining the end of a belt of this character. The surfaces of the drums 36 and 38 may be provided with sufficiently rough surfaces to prevent any relative sliding movement between the belt 34 and the drums 36 and 38. For this purpose, the surfaces may be painted with a mixture of paint and sand which is applied to the outer surfaces of the drum 36. If desired, only the surface of the large drum 36 need be painted in this manner, but the smaller drum 38 may also be painted. The joint at the ends of the belt may include belt hooks of the usual belt end securing construction. The belt 34 is made of a long rectangular sheet in which the sides and ends are as nearly as possible perpendicular to each other as it is possible to make them.

The proof sheet 30 may be of any of the usual proof papers, plastic, foil or board. This sheet also may be a long rectangular sheet which is secured to the belt 34 by masking tape at the leading and following ends of the proof sheet and elsewhere as desired. The ends of the proof sheet 30 are located on the belt 34 so that such ends straddle the joint of the belt 34. The ends of the belt 34 and the proof sheet 30 are not rotated past the printing cylinder 32. That is, the proof which is printed on the sheet 30 does not run past the ends of the proof sheet, but begin slightly spaced from one end of the proof sheet and may extend as far as desired toward the other end of the proof sheet, without running beyond such ends.

The press so far described, requires, quite often, a repeated printing on the same sheet 30 from a plurality of printing cylinders similar to cylinder 32, but which imprint different colors on the sheet 30. In order that the six to ten cylinders of the character shown at 32, for example, will produce super-imposed printings of extreme accuracy, as required by the present printing practices, the structure so far described is mounted on a base 62, FIGURES 1–6, in a manner so that all of the printing cylinders 32 can be absolutely matched with the original printing on the sheet 30 in a manner to become evident as the description proceeds.

*Rigid base and rails*

The base 62 may be a firm, generally horizontal, rectangular base having a front end or wall 64 and a rear end or wall 66, FIGURES 3 and 4. These walls 64 and 66 may be parallel. The base 62 may also have two horizontal, rigid, parallel side sides 68 and 70, FIGURES 3, 5, and 6. These members 64, 66, 68, and 70 may be made of heavy sheet metal, and their main bodies may be vertical walls made of such sheet metal.

The walls 64 and 66 may be longer in horizontal extent, but shorter in vertical extent than the walls 68 and 70, as will become evident by a comparison of FIGURE 3 with FIGURES 4 and 5. The walls 64 and 66 may have horizontal flanges 72 and 74 respectively, as shown in FIGURES 3 and 4. The side walls 68 and 70 may have vertical flanges 76 and 78 respectively, FIGURE 3. Horizontal plates 80 and 82, FIGURES 5 and 6, may be welded to the wall 68 and its vertical flanges 76. Horizontal plates 84 and 86 may be welded to the side wall 70 and its flanges 78, as is evident from FIGURES 3–6. All of the walls 64, 66, 68 and 70 may be welded together at the place of installation of the apparatus. In order to make the base 62 even more rigid, bars 88 may be attached to the walls 68 and 70 with suitable head pieces or attaching pieces 90, in the form of suitably riveted or threadedly engaging flanges, washers, nuts, etc., as will be evident to those skilled in the art.

If desired, suitable sleeves, not shown, may surround the bars 88, not shown, between the walls 68 and 70, to strengthen them.

After the base 62 has been rigidly secured together and welded, two horizontal, rigid, parallel, side rails 94 may be firmly bolted respectively to the horizontal plates 80 and 84, FIGURE 5, respectively, by means of bolts 96. The top flanges 98 of the side rails 94 may be ground off very accurately, so that their edges are absolutely parallel and of unchanging width, to comply with the closeness of tolerances required for this work. The side rails 94 may be originally I-beams, with the same width of flanges. However, the top flanges 98 of the I-beams are ground off and machine finished to provide an unchanging flat top surface with straight parallel sides.

A rigid or rigidly held horizontal front end rail 100 may be held absolutely at right angles to the side rails 94 by being bolted on the tops 98 of the rails 94 by the bolts 101, as shown in FIGURES 5 and 7. The rail 100 has its rear side 102, its front side portions 104, and the top and bottom surfaces 106 and 107 machine finished to an absolute smooth and parallel finish.

The front rail 100 has a downward extension 109 below the flange 112, which extends between the side rails 94, as indicated in FIGURES 2 and 23.

The purpose of finishing the surfaces 102, 104, 106, and 107 is to insure that the positioning of the plurality of printing rolls 32 will be absolutely parallel to the belt drums 36 and 38 and to the belt 34, notwithstanding any sidewise adjustment of the supports 368, FIGURE 21, for the printing cylinders 32 as may be required in "zeroing," etc. Likewise, the top surface 108, and the sides 110 of the side rails 94, FIGURE 7, are machine finished to true horizontal and vertical surfaces respectively, to insure absolute straight back and forth motion of the inverted channel members 116, FIGURE 7, which support the belt drums 36 and 38 and the belt 34, as will become apparent.

The front rail 100 may have a horizontal flange 112, FIGURE 7, which rests on the top surfaces 108 of the side rails 94. Front rail 100 also has spaced reinforcing walls 114 between the horizontal walls 112 and the vertical wall 100.

*The movable belt supporting carriage*

The movable supporting belt carriage 40 is mounted mainly on the top flanges 98 of the rails 94.

The main part of the movable carriage includes a pair of downwardly inverted channel members 116 and 118, FIGURES 2, 7–9, and 20, on which the belt drums 36 and and 38 are mounted.

Figure 8:
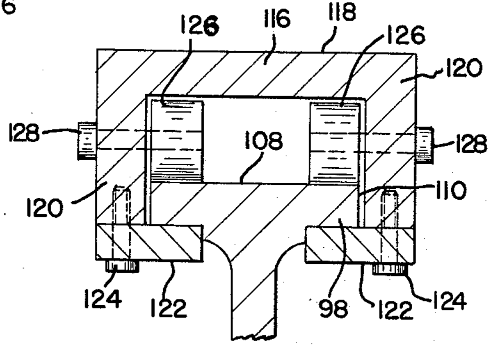
FIGURE 8 is an enlarged vertical cross section of a portion of the movable carriage.

The inverted channel members 116 have a top surface 118, FIGURE 8, and downwardly extending side walls 120, which extend to the bottom surfaces of the top flanges 98 of the side rails 94. Retaining plates 122 are bolted at 124 to the side walls 120 and extend under the flanges 98 of the members 94. Roller constructions 126 are bolted or otherwise secured at 128 inside the side walls 120 to support the channel members 116 movably on top of the side rails 94, as shown in FIGURE 8.

A transverse channel 121, FIGURES 2 and 20, is rigidly secured to the inner sides 120 of longitudinal inverted channels 116 of the movable carriage which supports the belt construction. The ends of the transverse channel 121 are welded to attaching plates 123 which are bolted or welded to the sides 120 of the longitudinal channels 116, which are supported by the rigid side rails 94. This insures additional rigidity to the movable carriage, and aids in preventing longitudinal displacement relatively between the two longitudinal channels 116.

Figure 10:
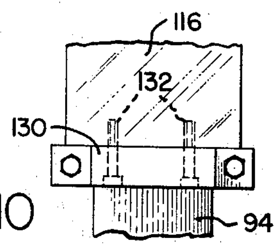
FIGURE 10 is a top view of FIGURE 9.
Figure 9:
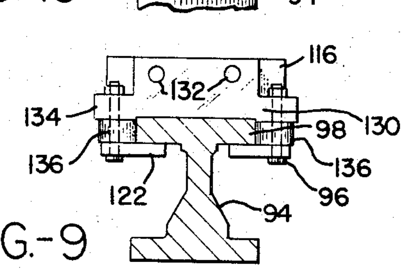
FIGURE 9 is a vertical cross section, in smaller scale, of another portion of the carriage.

Means are provided for insuring that there is no side play in the members 116, as they move along the side rails 94. For this purpose, end plates 130 are bolted at 132, FIGURES 9, 10 and 20, to all of the four ends of the inverted channel members 116. In FIGURE 7, the end plate 130 is shown detached from channel 116 to illustrate the attaching principle. These end plates 130 have outward extensions 134, FIGURES 7 and 9, to which are bolted roller constructions 136, which relatively tightly engage the side surfaces 110 of the top flanges 108 of the side rails 94. This construction insures that both ends of each of the members 116 are held in true alignment with the supporting members 94, and that no relative sidewise movement is produced in the carriage.

Bearing members 138, FIGURE 2, are bolted to the tops of channel members 116, for receiving the shaft 52 of the large drum 36. Also, adjusting "doctor" support members 140, FIGURES 1, 2 and 6, are also bolted to the channel members 116. These support members 140 adjust the arms 142, FIGURE 2, which are pivoted about the shaft 52, and carry the doctor supporting member 144 at their other ends. The doctor construction is well known, and is for the purpose of removing the excess ink from the printing cylinders 32, as the cylinders 32 rotate. The elevation of the doctor construction may be adjusted, because the lever 142, which is pivoted at 146 about the shaft 52 is also connected to an adjustable support 148, FIGURE 2. The support 148 is moved up and down by the screw 150 which is turned by the right angle gearing construction 152, which is turned by the shaft 154, and by the hand wheel 156, FIGURE 1.

The belt drum 38 is supported by the cantilever construction 158 which is mounted on the top surface 118 of the inverted channel construction 116 at the rear end thereof, as indicated in FIGURES 1, 2, 11 and 12. This cantilever construction may be of any suitable type, which can support the bearing constructions 160 for the smaller belt supporting drum 38 which has a shaft 162 extending into the bearing construction 160 at each end of the shaft. The bearing construction 160 may be supported on a horizontally movable plate 164, FIGURES 11 and 12. The plate 164 may be supported on cantilever channel members 166, which may be bolted at 168 on the tops of inverted channels 116. The channel members 166 may be of any character that will hold the plate 164 horizontally movable. For example, two plates 170 may be spaced by smaller plates 172 sufficiently spaced apart to receive the movable plate 164. These plates 170 and 172 may be bolted at 174 together, where they extend beyond the inverted channel 116, 120.

Figure 12:
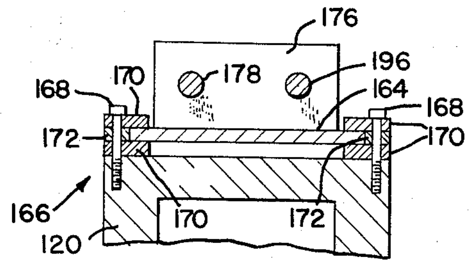
FIGURE 12 is a vertical cross section along the line 12—12 of FIGURE 11.
Figure 11:
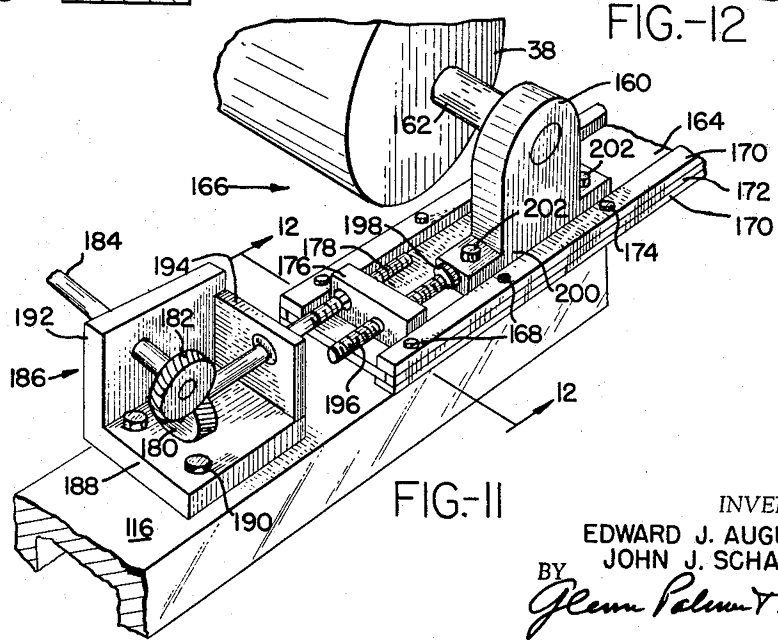
FIGURE 11 is a perspective view of the control means for the horizontal adjustment of the small belt drum.

Suitable means may be provided for simultaneously adjusting the plates 164 horizontally to tighten or loosen the belt 34, FIGURES 11 and 12. For example, a vertical plate 176 may be secured to the movable plate 164 between the channel members 166. The vertical plate 176 and the movable horizontal plate 164 may be adjusted horizontally by the screw 178, which is threaded into the plate 176, and has one of the gears 180, which is engaged by the gear 182, which is turned by the shaft 184. The shaft 184 may extend completely across the apparatus, so that gears 182 are secured to it at both sides of the apparatus, and a suitable handle may be provided for one of the ends beyond one of the gears 182.

The gears 180 and 182 form a right angle gear construction, as is well known.

The shaft 184 may be supported by a bracket 186, which is a right angle bracket, so that its horizontal portion 188 may be bolted at 190 to the inverted channel member 116. The vertical portion 192 may support the shaft 184. A vertical wall 194 may be connected to the horizontal and vertical portions 188 and 192, and through which the screw 178 passes, in a manner to be axially fixed but rotationally free in the wall 194, as is well known. Hence, turning of the gear 180 will cause the screw 178 to move the vertical wall 176 horizontally, to move the plate 164 and the bearing construction 160 also horizontally.

An individual adjustment for either of the bearing brackets 160 may be provided. This may be accomplished by providing a screw 196, which has a threaded construction in the plate 176, and has a head or the like 198, which pushes against the base 200 of the bearing construction 160. The bolts 202, which attach the base 200 of bearing 160 to the plates 164 may have a sufficient slotted construction in the plate 164, so that it can be loosened, to adjust the screw 196, and to move the bearing 160 individually along the plate 164 by means of the screw 196, if necessary to restore parallel conditions between the drum 38 and drum 36, or the like.

The hydraulic cylinder piston construction 42, FIGURE 2, may be supplied with hydraulic fluid from the tank 204 by means of the motor driven pump 206. The action of the piston 44 may be governed by the handle 208, FIGURE 1, and the motor may be controlled by the hand switch 210. The handle 208 controls a valve 212, for controlling the back and forth motion of the belt drums 36 and 38 and of the belt 34.

The motor 206, FIGURE 6, is a reversible motor, being reversed by the position of the handle 210 of the switch 211. The handle 210 has an off position, and two opposite direction positions which govern the direction of rotation and the stationary condition of the motor 206. The motor 206 drives a pump 207, which is a reversible pump and thus can cause the piston 44 to move in either direction.

The piston 44 actuates the forked construction 214, FIGURE 2, which is connected to a pivoted member 216, FIGURE 6, at the lower end of each of the levers 46 by means of a flat plate 218 which has sufficient strength along its edgewise construction to impart the necessary motion to the levers 46. The cylinder construction 42 is connected to a pin joint 220 which is also connected to an I-beam 222 which is attached to the wall 64 of the main base of the press. The I-beam 222 extends substantially for the entire length of the wall 64 thereby to impart the thrust from the cylinder 42 to the entire wall 64 and not produce any localized stress thereon.

The fulcrum pins 48 for the levers 46 are supported on L-shaped brackets 224, FIGURES 2 and 6, which are attached to the horizontal plates 80 and 84 respectively. The upper ends of the rods 46 are each provided with a slot 226 which receives a pivoted head 228 on the end of a pin 230 which is connected to the vertical sides 120 of the inverted channels 116. With this construction the pivoted head 228 can slide up and down the slot 226, as the rod 46 swings back and forth as the piston 44 is moved leftwardly in FIGURE 2, and the lower end of the rod 46 can move along an arc 232 to the dotted line position 218 because of the hinge construction at 220.

The doctor blade construction is well known, and hence is not illustrated. A rectangular member 234, which receives the doctor blade, is partially rotated by the handle 236 and its position can be selected by the motion of handle 236 when it is released by the ratchet and pawl construction 238, which is controlled by a spring pressed sub-handle 240, which is pivoted at 242, and has a connecting rod 244.

The doctor blade construction has been used for many years in connection with printing cylinders, which have ink applied to them in any well known manner, and the doctor blade construction removes the excess ink by having the doctor blade construction moved against the cylinder 32.

When there are series of printing cylinders, similar to 32, all of which are to make an impression on the proof sheet 30, it is necessary that each cylinder may be zeroed with the proof sheet 30, so that when each cylinder, subsequent to cylinder 32 is placed in the press in lieu of the cylinder 32, the engravings from the subsequent cylinders will match the imprint of the first cylinder 32 on the proof sheet 30. This is accomplished by proper zeroing procedures, as will now be described.

FIGURES 1, 2, 16, 17, 18, 19, 21 and 28 show details for zeroing the cylinders 32, with the proof sheet 30, so that each cylinder 32 will make the proper imprint on the proof sheet 30.

Figure 16:
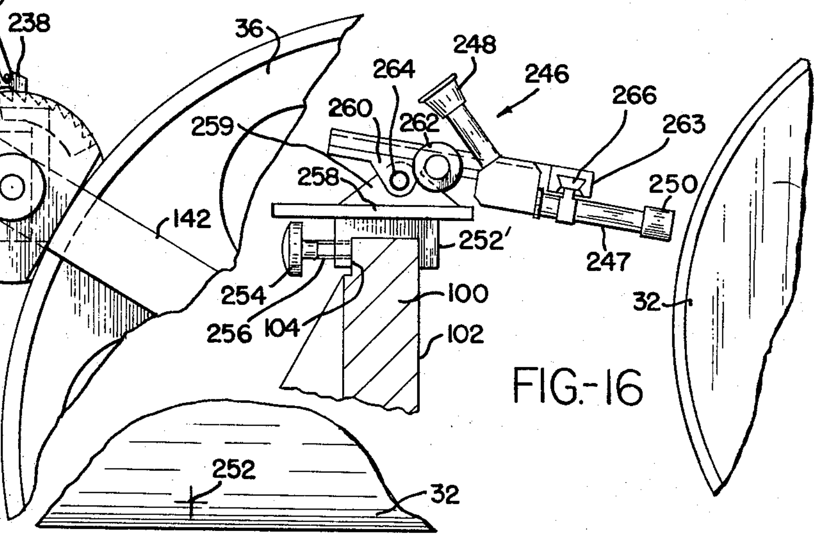
FIGURE 16 is a diagrammatic side view showing the support of a telescope construction for viewing a "zero" mark on the printing cylinders.
Figure 17:
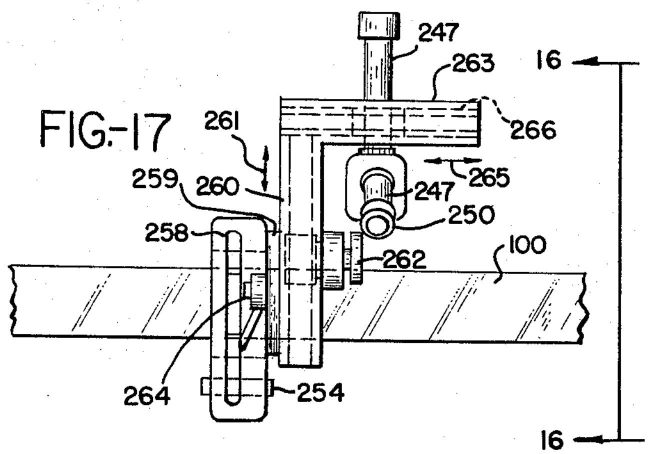
FIGURE 17 is a top view of FIGURE 16.

FIGURES 16 and 17 show a telescope with an eye piece 248 and a viewing lens construction 250. The operator can view the cylinder 32, and by proper manipulation of the telescope at the beginning of the first printing operation he can sight the telescope on a "zero" mark 252 which is made exactly in the same relative position on all of the cylinders 32 that are to be used with this particular proof sheet. This "zero" mark 252 may be an inconspicious cross mark which will not produce a conspicuous mark on the proof sheet 30.

The telescope 246 is mounted along any desired position on the front end rail 100. The telescope can be clamped in such desired position by the clamp 252' and by the handle 254, which operates the screw 256 tightly to clamp the side walls 102 and 104 of the rail 100. The clamp 252' carries a platform 258 having a flange 259 which the bracket 260 of the telescope is pivoted by shaft 264 in such a manner that the handle 262 may clamp the telescope 246 in the position as it has been pivoted about the fulcrum 264. The telescope may be focused by proper manipulation of the eye lens 248 and object lens 250. A lateral slide 266, or the like, may provide final lateral adjustment of the telescope. Such telescope may be of any obvious construction so that it is possible to manipulate the telescope construction along the rail 100 laterally back and forth and up and down and also to manipulate the cylinder construction 32 laterally in a manner to be described, so that the telescope is fixedly zeroed on the mark 252 before any printing has been started on the proof sheet 30. The telescope then held in this fixed position by its mounting means so that subsequent cylinders 32 can have their zero marks 252 zeroed into the sight cross hairs of the telescope. This insures that later cylinders are perfectly zeroed before the proof sheet 30 is pressed against such later cylinders 32.

The telescope construction 246 is a commercial product which enables the telescope to be given a back and forth motion as indicated by the arrow 261, in which the double heads of the arrow indicate that the support 260 permits movement in the directions of double heads. Also, the support 263 includes construction which permits the telescope 247 to be moved in both directions, as indicated by the double headed arrow 265. Since this is a commercial product, and is well known, it is only diagrammatically indicated. Details of the construction are omitted, as such details are well known to those supplying such a telescope construction. The construction is such that the telescope can be universally moved with respect to the clamp 252, so that the telescope 247 may be accurately sighted on the first zero mark 252, and then the telescope may be rigidly secured in a set position so that it will not be moved again during the entire proof printing process, which includes the use of all of a battery of related cylinders 32, all of which will be zeroed on the proof press by the telescope in such original set position.

Before the proof sheet 30 and belt 34 are brought into contact with the cylinder 32, the proof sheet belt 34, and proof sheet 30 are zeroed by a zeroing construction that is effective on the large drum 36, and which is shown in FIGURES 1, 2, 18 and 19. One end of the drum 36 is provided with a lock pin block 268 which may be bolted or welded to one end of the drum 36, and which has a pin receiving hole 270, which is properly tapered, to receive very effectively the cone shaped end 272 of a locking pin 274. The locking pin 274 is mounted on a bracket 276 that is bolted or otherwise attached to the top surface 118 of the inverted channel member 116. The bracket 276 may have a horizontal plate 280 and vertical plates 282 and 284 which have bearings 286 through which the pin 274 is slidable from the dotted line position in the hole 270 to the full line position, which is the retracted position, with the cone 272 retracted into the bearing construction 286. The pin 274 has a ring 288 rigidly secured thereto by a bolt or the like, not shown, and a compression spring 290 will move the rod or pin 274 rightward to the locking position shown in dotted lines whenever the handle 292 is moved circularly slightly into a slot, not shown, in the ring 294, so that the pin 296 may enter such slot, and the handle 292 may move to the dotted line position, while the pin 274 moves to the dotted line locking position 292 with the cone 272 in the hole 270. Then the pin will remain in locking position until the pin is retracted by pulling the handle 292 leftward and slightly turning it to hold it against the end of the ring 294 and away from the slot in the full line position 292.

Before the belt 34 and proof sheet 30 are moved into contact with the first cylinders 32, the drum 36, belt 34 and proof sheet are zeroed by placing the pin 274 with its cone 272 in the hole 270 which will hold the drum 36 in its zero position until such time as it is released. Then the drum 36, belt 34 and proof sheet 30 are brought into contact with the cylinder 32 after the cylinder 32 has been zeroed by the telescope construction of FIGURES 16 and 17. After such contact has been made, then the pin 274 and handle 292 are retracted to the left position of FIGURE 18 thus releasing the drum 36 for rotation. Then the first printing from the first cylinder 32 is made by rotating the drum 36 manually by means of the slow motion wheel 54, if desired, or the faster motion wheel 50 if the contact is not too tight. Ordinarily the wheel 50 is used for rough and loose positioning of the drum 36, whereas the wheel 54 is used thereafter for fine work, and for tight contact.

After the proof has been made on the sheet 30 by rotation of the belt 34, proof sheet 30, and the drums 36 and 38 as well as of the printing cylinder 32, the printing operation is stopped. The belt 34, drums 36 and 38 and carriage 40 are then moved backward away from the cylinder 32 to the positions shown in FIGURES 1 and 2. The first cylinder 32 is removed in a manner to be described and the second cylinder 32 is placed in the cylinder supports to be described and zeroed by the telescope 246 on its corresponding zero mark 252 which should be in the identical relationship to the printing engravings as the mark 252 of the first cylinder 32. Then the belt 34 and the proof sheet 30 are rotated, returned to their zero position by rotating the drum 36, so that the pin 274 can be placed in the hole 270 with the proof sheet 30 in the exact position that it was at the beginning of the first printing operation. Then the second printing operation can be made substantially in the same manner as has been described in connection with the first printing. However, the printing of the second cylinder will be in a different color, shade or the like, as desired. This procedure may then be repeated with as many cylinders 32 as desired, to produce as many various colors, shades and the like as is necessary. Each time, the cylinder and the proof sheet are zeroed as previously described.

*Short printing cylinders 32*

The apparatus of this invention may be used with relatively short cylinders 32 such as shown in FIGURES 1 and 21. These cylinders 32 have cone shaped end surfaces 296 on end rings 297 which are pressed into the outer cylinder sleeve 298 of the cylinders 32 at the enlarged cylindrical openings 299. The cone shaped surfaces 296 are machine finished on the inside of the rings 297.

Referring now mainly to FIGURES 21–24 and 33–35, the inner cone shaped surfaces 296 of the printing cylinder 32 each engages a rotatable cone shaped disc construction 300 in a relatively snug and tight manner. The cone shaped disc construction 300 is rotatably supported on a rotatable axial extension 302 which is rotatably supported, but axially fixed on the cantilever support 304. This rotatable and axially fixed support is provided by the slanting rollers 306, which may be part of unitary roller race constructions 308 which are secured respectively in the cantilever supports 304 and in the axial extensions 302. The rotatable axial extension may be held together with the cone shaped disc 300 by means of a bolt construction 310, which extends from the washer like head 312 of the extension 302 to the disc construction 300.

The arrangement between the cantilever support 304 and the printing cylinder 32 is such that the cantilever supports 304 at each end of cylinder 32 can be moved sidewise, or axially away from the cylinder 32 and will carry with them the cone shaped construction 300 a sufficient distance away from the ends of the cylinder 32, so that the cylinder 32 can be lifted out of the machine, and a new printing cylinder 32 may be lowered into the machine, and may then receive the cone shaped disc members 300, when they are brought inward by the inward movement of the cantilever supports 304 in a manner to hold the new cylinder 32 substantially in the same position as the cylinder 32 which had just been removed.

FIGURE 21 together with the smaller scale showing in FIGURES 28 and 29 show diagrammatically how the cantilever supports 304 can be moved away from each other, or toward each other, by the turning of the hand wheel 314, so that the cylinders 32 may be removed and/or placed in the apparatus whenever desired. The hand wheel 314 moves the cantilever supports 304 substantially the same distance toward and away from the cylinders 32, and the supports 304 can be restored substantially to their original position, when a new cylinder 32 has been inserted or held for engagement by the disc constructions 300.

The arrangement shown in FIGURES 21, 28 and 29 also is of a character that another hand wheel 316 may be turned, and this causes the cantilever supports 304 to be moved laterally in unison, so that the cylinder 32 may be laterally adjusted. Each cylinder 32 may be zeroed laterally to move its "zero" cross mark 252, FIGURE 17, to coincide with the cross hairs of telescope 246, FIGURES 16 and 17, which is elsewhere described. Therefore, the engravings in each new printing cylinder 32 will be laterally identical with the engravings of the previous printing cylinders 32.

As indicated in FIGURE 21, the hand wheel 314 is fixed to a shaft 318, so that turning of the hand wheel 314 turns the shaft 318. The shaft 318 has left hand threads diagrammatically indicated at 320, for example, which threadedly engage and pass through the properly threaded openings 322, FIGURE 23, in the right hand cantilever support 304 shown in FIGURE 21. The shaft 318 also has a right hand thread diagrammatically indicated at 324, for example, which passes through a corresponding threaded hole 322 in the left hand cantilever 304 shown in FIGURE 21. A portion 326 of the shaft 318 may be left unthreaded, if desired. Therefore, when the shaft 318 is held against axial movement, and is turned by the hand wheel 314, the cantilever supports 304, which are shown in FIGURE 21, will move either toward each other, or away from each other, depending upon the direction of the rotation of the wheel 314.

The shaft 318 is held against axial movement as long as the other hand wheel 316, and its shaft 328 are not turned. However, if such hand wheel 316 and shaft 328 are turned, then the shaft 318 is moved axially, and if the hand wheel 314 is not turned at that time, then the shaft 318 is moved axially and carries with it both the cantilever supports 304, and the cylinder 32, so that the cylinder 32 can be laterally zeroed or otherwise positioned as desired.

To permit the shaft 318 to move longitudinally when desired, the shaft 318 is supported at each end by the plates 330, through which it passes in unthreaded bearings 332, so that the shaft 318 is free to move axially through the support plates 330. The plates 330 may be rigidly secured to the front rail 100 by means of bolts 334.

To move the shaft 318 longitudinally, an adjusting shaft 336, FIGURES 21 and 28, has a threaded portion 338 and an unthreaded portion 340. The unthreaded portion 340 passes through an unthreaded bearing 342 in the plate 330, so that the shaft 336 is free to rotate without having any axial thrust imparted to it by reason of its passing through the support plate 330. To insure that the shaft 336 has no axial movement, a pair of axial lock rings 344 are secured to the shaft 336 on each side of the plate 330, to prevent any such axial movement. These lock rings are secured to the shaft by screws 346.

To rotate the shaft 336 by the hand wheel 316, a sprocket wheel 348 is fixed on the end of the shaft portion 340, around which the chain 350 is engaged. The chain 350 passes around the sprocket wheel 352, which is fixed to the end of the shaft 328, which is rotated by hand wheel 316. Hence, rotation of the hand wheel 316 and the shaft 328, in turn rotates the unthreaded portion 340 of the shaft 336. The shaft 328 may be supported by one or more bearings 354, which may be mounted on one or more of the reinforcing walls 114.

Rotation of the hand wheel 316 and shaft 336 causes axial movement of the shaft 318 for laterally zeroing the printing cylinders 32, as follows. A movable member or plate 356 has an unthreaded bearing engagement 358 with the shaft 318 and has a threaded bearing engagement 360 with the threaded portion 338 of the shaft 336. The shaft 318 is axially locked with respect to the plate 356 by means of a pair of axial lock rings 362, which are axially locked adjacent the plate 356, by the screws 364. The plate or member 356 may extend into a notch 366 in the end or front rail 100, without engaging such rail 100, so that the member 356 can move sidewise within the notch 366.

It is therefore to be seen, that when the threaded shaft 336 is rotated by turning of the wheel 316, the movable plate 356 is moved sidewise by the action of the thread 338, and the sidewise movement of the plate 356 moves the shaft 318 axially sidewise of FIGURE 21 by reason of the lock rings 362.

Hence, FIGURE 21 shows how rotation of the hand wheel 314 can move the cantilever supports 304 toward or away from each other to cause the cylinder supporting cone discs 300 to support or release the cylinder 32, as desired. FIGURE 21 also shows how rotation of the hand wheel 316 can move the cylinder 32 axially, or sidewise in FIGURE 21, for the purpose of zeroing the cylinder 32, or for the purpose of selecting a desired position for the cylinder 32 laterally along the rail 100.

The location of the hand wheel is coordinated with the general location of the printing cylinders 32 and the telescope 246 in a manner so that the hand wheel 316 can be readily manipulated during the zeroing action.

The cantilever supports 304 may be of any desired construction which will maintain the cantilever supports 304 against any vertical movement which is likely to move the cylinder 32 vertically while in operation or while being supported. Also, the cantilever supports 304 may be of suitable construction, so that they can be rigidly maintained against lateral movement, which might accidentally displace the cylinder 32 laterally in FIGURE 21, or which might produce any loose action between the discs 300 and the ends of the cylinder 32.

Merely by way of example, the following more detailed description of the supports 304 which efficiently hold the ends of the cylinders in the selected positions during the printing operation and also provide movement of the supports 304 relatively toward and away from each other, and also provide for the simultaneous lateral movement of said supports 304 will now be given.

The cantilever construction 304 may have a central member 368 which is shown in FIGURES 21–27 and 33–36. This member 368 has a thick main body 370, FIGURES 25–27, with a top lip 372, which rests on the top surface 106, FIGURE 23, of the rail 100. This thick main body 370 also has the threaded hole 322, through which the threaded portion of shaft 318, FIGURE 21, passes. It also has vertical finished surfaces 374 and 376, FIGURE 26, which engage the rear vertical wall 102, FIGURE 23, of the front rail 100. This main body 368 is adapted to be used with cylinders of a different character than cylinders 32, and for this purpose a finished cylindrical arc 378 with a side lip 380 is provided on each side of the member 368. The member 368 also has a relatively thin web 382 which provides great vertical strength to the cantilever construction.

The center of the arc 378 is not suitable for use with the cylinders 32, so that an adapter construction is provided to receive the rotatable axial extension 302, and the roller constructions 306 and 308 which are shown in FIGURES 33–36, which will be later described.

The cantilever members 304, FIGURES 22–24 and 33–35, preferably are provided with a pair of top rollers 384, which ride on the top surface 106 of the front rail 100. The cantilever construction 304 also has a pair of top front rollers 386 which ride against the front vertical surface 104 of the rail 100. They also have a pair of bottom front rollers 388, which ride against a vertical bottom finished surface 390 of the front rail 100.

If desired, a bottom horizontally T-shaped flat plate 392 may be secured to the bottom of the main body 370, to which may be attached a pair of bottom rear rollers 394, which engage the lower rear vertical surface 376 of the front end rail 100, FIGURE 23.

Any suitable arrangement desired may be used to accomplish this arrangement. This can be done by bolting together plates and bars, with finishing operations, as desired.

For example, the top rollers 384 may be held by a pair of vertical plates 383, FIGURES 23 and 24, which may be welded respectively to each of a pair of arms 385. The arms 385 may be welded or bolted to the main body 370 of the central cantilever member 368.

The front top rollers 386 may be carried by a rectangular bar 369 which may be bolted to the top lip 372 of the cantilever member 368.

The front bottom rollers 388 and the rear bottom rollers 394 may be carried on top of the bottom flat plate 392 which plate may be bolted at 393 to the bottom of the main body 370 of the central member 368. The bottom rollers 395 may be carried by the arms 397 of the T-shaped plate 392, FIGURES 23 and 24.

In order to provide a suitable construction on the previous arc 378 of FIGURES 25, 26 and 27, to receive the rotatable axial extension 302 and roller bearings 306 of FIGURE 36, a pair of roller bearing receiving members 396 may be provided which fit along the outer surface of the rim 380 of the main body 368. The members 396 are carried by the arms 385 which may be bolted or welded at 387 to the members 396. The members 396 may be bolted at 397 to the side lip 380 of the main member 368. A spacer member 398, FIGURE 33, has an outer surface which is shaped to rest on the previous surface 378 of the central member 368.

The members 396 and 398 have a center axis about which cylindrical surfaces, etc., are made for receiving and cooperating with the rotatable axial extension 302 of the printing cylinder supporting cone discs 300. For example, the members 396 have a cylindrical bore 404, FIGURES 33 and 34, which receive the outer rings 406 of the roller race 308. The inner race rings 408 are attached to a rotatable tube construction 410 to which the ring with diameters 412 and 414 is secured. The other end of the tube 410 is provided with external threads 416 to receive the lock nut 418 and the washer 420. The bolt 310, with its bolt head 422, is inserted in the tube 410, and passes therethrough and its threaded end is threaded into the threaded bore 424 of the cone shaped disc construction 300.

It is thus to be seen that any suitable type of cantilever construction may be provided as indicated diagrammatically at 304 in FIGURE 21, which accurately and firmly holds the cone shaped disc constructions 300 which receive the cone shaped ends of the cylinders 32. The cylinders 32 can be removed easily merely by supporting the cylinder which is in the proof press by a suitable hoisting belt or the like and then moving the cantilever constructions 304 outwardly sufficiently so that the ends of the cylinders 32 just clear the disc constructions 300. Other cylinders 32 may be substituted in lieu of the previously removed cylinder.

The cylinders 32, without outwardly extending shafts are of a very advantageous construction.

The apparatus of this invention is particularly adapted for use with rotogravure processes in which the cylinders 32 are carefully etched with slight indentations in them. Ink is placed on these rollers and in these indentations, in a well known manner, and the excess ink is removed by a doctor blade, of known construction, after which the rollers 32 engage the proof sheet 30. This requires extremely accurate work in order that the proof may be satisfactory, and also the construction is such that the series of rollers that are to produce a multi-colored advertisement, or the like, is sufficiently well engraved, to be satisfactory to the purchaser of the series of printing cylinders which are then applied to a high-speed press of the multicolor type. It is possible to manufacture and test and demonstrate the satisfactory character of such a series of cylinders by the use of this apparatus.

Sometimes, however, it may be desired to use longer rolls or cylinders than the cylinders 32 with the cone shaped ends 96. For this purpose a special set of supports may be provided. The parts which correspond to those diagrammatically illustrated in FIGURE 21 are indicated by the same reference numerals in FIGURES 28 and 29, although the exact shape of the various parts may not be exactly the same.

FIGURES 30–32 and 37–39 illustrate the application of relatively longer printing cylinders, such as shown at 430, FIGURE 31, to the proof press heretofore disclosed. The cylinder 430 is much longer than the cylinders 32. The cylinders 32 may be 6″–8″ in diameter, and the cylinders 430 may be 8″–22″ in diameter. This provides a very satisfactory contact surface between cylinders 32 or 430 and the proof sheet 30, when it is curved by the belt 34, as it passes between the large drum 36 and the printing cylinder 32 or 430.

The cylinder 430 may be in the neighborhood of 80″–84″ more or less in length, which also may be the length of the large drum 36.

The printing cylinder 430 may be provided with rugged and firm shafts 432.

A flange construuction 434, FIGURES 37–39, is placed over each of the shafts 432 which has a ball or roller bearing construction 435 attached thereto. The flange construction 434 extends longitudinally inside the ball bearing construction, and has a flange 436, FIGURE 39, on the cylinder side of the ball bearing 435. The flange construction 434 may be a split flange construction which can be pulled together or spread apart by operation of the bolts 433, which are shown in FIGURE 37.

A pair of rugged supporting plates 450 may be made of heavy steel or the like and may be bolted at 451′ and 453 along the upper flanges 98 and the lower flanges 99 of the side rails 94.

Adapter plates 452 may be bolted to both sides of the plates 450. The plates 450 may have ball bearing receiving arcs at 451 which receive the ball bearing constructions 435. The outer ring of the ball bearing 435 may rest stationarily on the receiving arc 451 of the plate 450. The inner ring (not shown) of the ball bearing 435 may rotate with the inner part of the flange constructon 434 and with the shaft 432. The adapter plates 452 may have flange engaging washers 453 which engage the flange members 434 and 436, and prevent longitudinal displacement of the shaft 432 and cylinders 430 after the bolts 433 are tightened.

The cylinder 430 is placed in the press with the roller bearing engaging the arcs 451 of the plates 450. However, the flange construction 434 is initially longitudinally loose on the shaft 432 by reason that the bolts 433 are loosened to permit spread of the flange construction 434. The drum 430 is then zeroed longitudinally with the use of the telescope 247, similarly as described in connection with FIGURE 17. The longitudinal zeroing movement of the cylinder 430 is produced by turning the bolts 458 to be described. Then the flange 434 construction is tightened by tightening the bolts 433 axially to fix the shaft 432 and the cylinder 430 with respect to the proof sheet 34.

Several of the cylinders 430 may be used serially to print on a proof sheet, substantially in the same manner as has been described in connection with the cylinders 32.

On the outside of each plate 450 there is attached by suitable framework 456 the screw bolt 458, which has an end 460 which engages the end of the shaft 432 of the cylinder 430. By this construction the cylinder 430 may be longitudinally zeroed with the aid of the telescope 246.

The framework 456 may include a plate 462, which is bolted at 464 to the outer side of each of the bearing plates 450. Another plate 466 is bolted to the plate 462. This may be done by bolting rectangular rods or plates 468 and 470 between the plates 462 and 466 by bolts, shown in FIGURE 32, inside the rods 468 and 470. Another plate 472 is bolted to plate 466 by bolts 474 loosely in large holes 476 so the plate 472 can be adjusted to align the bolt 458 with the end of the shaft 432 of the cylinder 430.

The supporting plates 450 may be tied to each other by a long rod 477 which is bolted to the plates 450 and extends from one plate 450 on one side of the press to the other plate 450 on the other side of the press. Rod 477 may support the telescope 246.

The flanges 99 of the side rails 94 may also be machine finished, as are the flanges 98, where they are contacted by the side flanges which may be provided on the plates 450, as shown in FIGURE 32.

When it is desired to use the support for the cylinder 430 on the supporting plates 450, all of the mechanisms for the cylinders 32 which are in the way of such use must first be removed. For example, if desired, the end rail 100, shown in FIGURE 21, and elsewhere, may be removed along with all of the other parts which support and operate the cylinders 32. The end rail 100 may be removed by unbolting the bolts 101 of FIGURE 21.

A series of cylinders 430 may be serially mounted in the proof press and accurately zeroed with respect to each other, as is obvious from the disclosure in connection with FIGURES 30-32 and 37–39.

A very accurate proof press is thus provided that may receive extra long proof sheets. Also, it may receive the shorter cylinder constructions 32 serially if an efficient manner and with very accurate zeroing of the serially received cylinders. Also, it may receive serially extra wide proof sheets and extra long cylinders 430. These cylinders 430 may also have extra size of diameter and circumference, so engravings of extra size may be made both in height or width of the engraving, as desired.

Hence the proof press of this invention is also very versatile.

While the form of the invention now preferred has been disclosed as required by statute, other forms may be used, all coming within the scope of the claimed subject matter which follows.

What is claimed is:

1. A proof press comprising: a printing cylinder having end portions; holding means rotatably to hold said cylinder; a proof belt to which a proof sheet may be attached; two rotatable belt supporting drums parallel to each other and parallel to said cylinder upon which said belt is mounted; belt moving means to move said drums and belt toward and away from said printing cylinder for printing engagement between said proof sheet and said cylinder; said holding means including two cylinder bearing members respectively at the end portions of said cylinder having releasing and receiving means for releasing and cylinder for removal from said press and for receiving a second cylinder in the same position as said first-named cylinder; a cylinder zero mark on each of said cylinders; belt zeroing means for locking said belt in zero position to prevent rotation of said belt while said first-named cylinder is being removed from said bearing members and said second cylinder is being received by said bearing members; a cylinder zero mark viewing telescope having a zero mark indicator in its viewing field for viewing said cylinder zero marks after said cylinders have been received by said bearing members; and cylinder zeroing means for rotatably and endwise moving and thereafter holding said cylinders to place and to hold each of said cylinders in zero position with its respective zero mark held in the zero position of said zero mark indicator until said belt is moved into contact with said respective cylinder.

2. A proof press comprising: a printing cylinder having two end portions; holding means rotatably to hold said cylinder end portions; a rotatable proof sheet carrying member to which a proof sheet may be attached and including a drum parallel to said cylinder; means to move said proof sheet carrying member toward and away from said printing cylinder for printing engagement between said proof sheet and printing cylinder; said holding means including two cylinder bearing members respectively at said end portions of said cylinder and having releasing and receiving means for releasing said cylinder for removal from said press and for receiving a second cylinder in the same position as said first-named cylinder, said second cylinder having two end portions to be received and released by said bearing members; said releasing and receiving means including bearing member moving means to move said bearing members relatively toward and away from each other for interchangeably receiving and releasing said first-named cylinder and receiving and releasing said second cylinder; a bearing member moving first rotatable shaft having a left hand thread engaging a correspondingly threaded opening in one of said bearing members, said shaft having a right hand thread engaging a correspondingly threaded opening in the other of said bearing members, said first shaft moving said bearing members toward and away from each other to receive and release said cylinders, said first shaft being axially movable; a movable shaft moving member rotatably freely but axially fixedly connected to said first rotatable shaft; and a second rotatable shaft which is axially fixed and has a threaded engagement with said movable shaft moving member axially to move said first shaft and said bearing members simultaneously axially while holding a cylinder between them, said second rotatable shaft being relatively short and being located adjacent the end of said first shaft; and a third shaft rotatably driving said second shaft adjacent the end of said first shaft, said third shaft extending adjacent the central part of said first shaft and having a manipulator at said central part for moving said cylinder axially.

3. A proof press according to claim 2 in which a rigidly held horizontal end rail is held parallel to and in front of said cylinder; and said bearing members are cantilever support members which are longitudinally movably supported on said horizontal end rail and in which all three of said shafts are supported on said horizontal end rail.

4. A proof press according to claim 3 in which said cantilever members each has a rotatable cylinder end portion engaging member which is moved into and out of engagement with a respective cylinder end portion.

5. A proof press according to claim 4 in which said end portion engaging member is a cone shaped member, and said respective cylinder end portion has a cone shaped portion engaged by said cone shaped member.

6. A press according to claim 5 in which a telescope with a zero mark indicator in its viewing field is mounted on said end rail and is directed towards said cylinders to view a zero mark on each of said cylinders and in which a belt zero locking means is provided to lock said belt against rotation while said belt is moved from said cylinders.

7. A proof press comprising: a base having two horizontal parallel rigidly held side rails; a rigidly held horizontal hand rail mounted perpendicularly to and on said side rails; two printing cylinder end portion bearing members supported by said end rail; a printing cylinder having end portions supported by said bearing members and supporting said cylinder horizontally and perpendicularly to said side rails; a rigid proof belt carriage supported by said side rails for movement toward and away from said cylinder including inverted channel members longitudinally movable on said side rails; a transverse channel with its ends firmly secured to the inner sides of the rear ends of said inverted channel members; a pair of proof belt drums horizontally and rotatably supported by said carriage perpendicularly to said side rails and parallel to said cylinder the front one of said drum extending down between and below said side rails, and the rear one of said drums being a relatively small drum completely above said side rails, said drums having shaft bearings on top of said inverted channels; and a proof belt supported by said drums to which a proof sheet may be attached, said proof sheet being movable into and out of printing engagement with said printing cylinder.

8. A proof press according to claim 7 in which means are provided on said bearing members to release said printing cylinder for removal from said press and for receiving a second printing cylinder in the same position as said first-named cylinder; and means for zeroing and firmly holding against rotation said proof belt while out of contact with said first-named cylinder and while said first-named cylinder is being removed and said second cylinder is being received by said bearing members, means for zeroing said cylinders and holding said respective cylinders against rotation and longitudinal movement after said respective cylinders have been zeroed and until said belt is moved into contact with said respective cylinders.

9. A proof press according to claim 8 in which said inverted channel members are longitudinally reciprocated on said side rails by a cylinder piston construction.

10. A proof press comprising: a firm, generally horizontal rectangular base having a heavy sheet metal front wall, a heavy sheet metal rear wall and two heavy sheet metal side walls rigidly secured together at the place of use of said press; two parallel I-beam side rails firmly secured adjacent the tops of said side walls, said side rails having roller bearing receiving top flanges accurately ground and machine finished; a rigid generally L-shaped horizontal front end rail firmly secured on top of the front ends of said side rails and having a rear wall with rear wall roller bearing surfaces machine finished to a smooth parallel finish; a rigid frontwardly and backwardly movable belt carriage including two downwardly inverted channel members with roller bearing constructions supported at the top and side of said top flanges; a relatively large front belt drum with a central shaft supported in end bearing constructions mounted at the front ends and on the tops of said inverted channel members; a relatively small rear belt drum with a central shaft mounted on the rear ends and on tops of said inverted channel members; a proof belt rotatably mounted on said belt drums; printing cylinder end supporting cantilever members backwardly extending and supported from said front end rail with roller bearings engaging said rear wall roller bearing surfaces of said front end rail, said cantilever members having endwise engaging, printing cylinder end supporting members with roller bearings; a first rotatable shaft mounted on said front end rail having means for moving said cylinder end supporting members toward and away from each other by rotation of said first rotatable shaft; a relatively short second rotatable shaft mounted on said front end rail adjacent the end of said first shaft and having means for axially moving said first shaft by rotation of said second rotatable shaft; a third shaft mounted on said rail with means at one end to rotate said second rotatable shaft and with a manipulator at its other end adjacent the central part of said first shaft; rotation of said first shaft causing said cylinder end supporting members to move toward and away from each other to receive and release the ends of printing cylinders for printing on a proof sheet on said belt, and rotation of said manipulator causing said printing cylinders to be axially moved to properly locate said cylinders laterally with respect to the proof belt of the press.

11. A front end rail for use in a proof press, said end rail being a generally L-shaped horizontal front end rail firmly to be secured at the front of said proof press and having a rear wall with rear wall roller bearing surfaces machine finished to a smooth parallel finish; printing cylinder end supporting cantilever members backwardly extending and supported from said front end rail with roller bearings engaging said rear wall roller bearing surfaces of said front end rail, said cantilever members having endwise engaging, printing cylinder end supporting members; a first rotatable shaft mounted in said front end rail having means for moving said cylinder end supporting members toward and away from each other by rotation of said first rotatable shaft; a relatively short second rotatable shaft mounted on said front end rail adjacent the end of said first shaft and having means for axially moving said first shaft by rotation of said second rotatable shaft; a third shaft mounted on said rail with means at one end to rotate said second rotatable shaft and with a manipulator at its other end adjacent the central part of said first shaft; rotation of said first shaft causing said cylinder end supporting members to move toward and away from each other to receive and release the ends of printing cylinders for printing on a proof sheet on said belt, and rotation of said manipulator causing said printing cylinders to be axially moved to properly locate said cylinders laterally with respect to the proof belt of the press.

12. A front end rail for use in front of a proof belt drum of a proof press, said end rail having a vertical rear wall with a reinforcing front wall means, said vertical rear wall having its rear side surface, its front side upper and lower vertical surfaces, and its top and bottom horizontal edge surfaces machine finished to a smooth and parallel finish; two printing cylinder cantilever supports supported on and extending rearwardly from said rear wall; each of said cantilever supports having a pair of top rollers engaging said top horizontal surface, a pair of top front rollers engaging said front upper vertical surface, a pair of bottom front rollers engaging said front lower vertical surface, a pair of bottom rear rollers engaging a lower portion of said rear vertical surface, and a pair of bottom rollers engaging said bottom horizontal edge surface; each of said cantilever supports having a pair of roller bearings adjacent the rear ends of said cantilever supports with their axes parallel to said proof belt drums; and each of said pairs of roller bearing having a printing cylinder end engaging means rotationally supported and axially fixed in said pairs of rollers bearings, said cylinder end engaging means being adapted to receive and hold cylinder ends of any of a plurality of printing cylinders to be supported by said cantilever supports.

13. A front end rail according to claim 12, wherein said two cantilever supports have respectively a right hand internally threaded opening and a left hand internally threaded opening; a centilever support moving rotatable shaft means supported on said front end rail passing through and threadedly engaging said internally threaded openings selectively to move said cantilever supports toward and away from each other for receiving and releasing any of said plurality of printing cylinders; and axial moving means supported on said end rail axially to move said rotatable shaft means axially to move any of said plurality of cylinders received in said cantilever supports.

14. A front rail according to claim 13 including manipulator means adjacent the central part of said shaft means selectively to operate and stop said axial moving means.

References Cited

UNITED STATES PATENTS

| | | | |
|---|---|---|---|
| 1,103,805 | 7/1914 | Mertens | 101—407 |
| 1,524,082 | 1/1925 | Burns | 308—207 |
| 2,048,972 | 7/1936 | Scheffler | 308—236 X |
| 2,124,420 | 7/1938 | Kaddeland | 101—247 |
| 2,405,637 | 8/1946 | Behrens | 242—68.4 |
| 2,539,965 | 1/1951 | Moss et al. | 101—247 X |
| 2,587,606 | 3/1952 | Dungler | 101—248 |
| 2,706,449 | 4/1955 | Lembo | 101—248 |
| 2,714,352 | 8/1955 | Rookyard | 101—212 |
| 2,873,672 | 2/1959 | Sauberlich et al. | 101—153 |
| 3,057,292 | 10/1962 | Larsen | 101—247 X |
| 3,186,336 | 6/1965 | Kirby | 101—216 |
| 3,208,377 | 9/1965 | Hantscho | 101—248 |

ROBERT E. PULFREY, *Primary Examiner.*

J. R. FISHER, *Assistant Examiner.*